United States Patent [19]
Williams et al.

[11] Patent Number: 5,982,291
[45] Date of Patent: Nov. 9, 1999

[54] ELECTRIC FENCE SECURITY SYSTEM

[76] Inventors: Julie A. Williams, 420 Broken Lance, Alpharetta, Ga. 30302; James D. Kelley, 1815 Elmwood Cir., Snellville, Ga. 30078

[21] Appl. No.: 09/119,366

[22] Filed: Jul. 20, 1998

Related U.S. Application Data

[63] Continuation-in-part of application No. 08/829,164, Mar. 31, 1997, abandoned.

[51] Int. Cl.⁶ .................................................. G08B 21/00
[52] U.S. Cl. .......................... 340/635; 256/10; 340/505; 340/539; 340/540; 340/825.16; 340/825.36; 340/825.54
[58] Field of Search ................................. 340/635, 661, 340/540, 505, 539, 531, 825.16, 825.17, 825.18, 825.36, 825.54; 256/10

[56] References Cited

U.S. PATENT DOCUMENTS

| | | | |
|---|---|---|---|
| 3,831,162 | 8/1974 | Armstrong | 340/525 |
| 4,097,025 | 6/1978 | Dettmann et al. | 256/1 |
| 4,220,949 | 9/1980 | Pope et al. | 256/10 |
| 4,297,633 | 10/1981 | McCutchan et al. | 324/527 |
| 4,523,187 | 6/1985 | Begg | 340/661 |
| 4,703,451 | 10/1987 | Calabrese | 340/825.18 |
| 4,725,825 | 2/1988 | McKean | 340/660 |
| 4,736,194 | 4/1988 | Sticksel | 340/541 |
| 4,803,468 | 2/1989 | Seifert | 340/566 |
| 4,803,635 | 2/1989 | Andow | 702/58 |
| 4,829,284 | 5/1989 | Pfaff | 340/524 |
| 4,931,771 | 6/1990 | Kahn | 340/556 |
| 5,302,945 | 4/1994 | Stoltenberg | 340/660 |
| 5,438,316 | 8/1995 | Motsinger et al. | 340/541 |
| 5,550,530 | 8/1996 | Hamm | 340/564 |
| 5,602,534 | 2/1997 | Granat | 340/572.1 |
| 5,651,025 | 7/1997 | May | 256/10 |

*Primary Examiner*—Glen Swann
*Attorney, Agent, or Firm*—Troutman Sanders LLP; James D. Wright, Esq.

[57] ABSTRACT

Electric fences used to keep animals in or out of a particular area of land often cover great distances over all manner of terrain, making it very difficult to ensure the effectiveness of the entire length of the fence, especially at points distant from a human supervisor or at points which are not in a direct line of sight from a human supervisor. This invention relates to an electric fence monitoring system having a centrally located monitor and one or more remote units positioned along the fence, where the monitor uses wireless communication to broadcast a request for information related to one or more electrical conditions of the electric fence and the remote unit receives the request, takes a reading and uses wireless communication to broadcast a data message back to the monitor via wireless communication.

26 Claims, 9 Drawing Sheets

MATCH LINE TO FIG. 6B

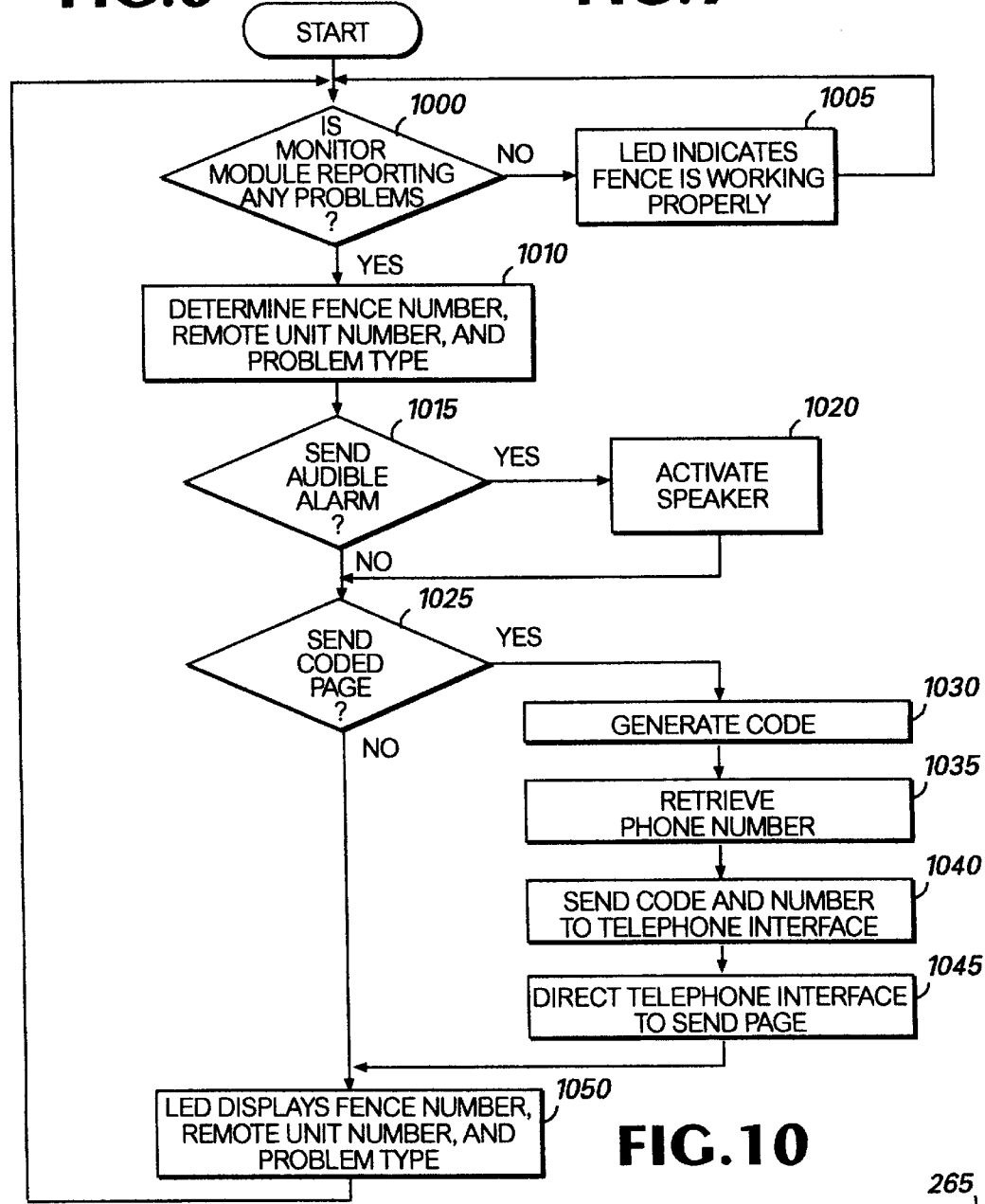

ELECTRIC FENCE SECURITY SYSTEM

CROSS REFERENCE TO RELATED APPLICATION

This application is a Continuation-in-Part of U.S. patent application Ser. No. 08/829,164 filed Mar. 31, 1997, abandoned.

BACKGROUND OF THE INVENTION

1. Technical Field

This invention relates to the field of electric fence monitoring systems, and particularly relates to electric fence monitoring systems for detecting and localizing a break in an electric fence.

2. Description of the Prior Art

The use of electric fences for the retention of animals has been known for many years. Electric fences utilize a fence energizer to generate high-voltage electrical pulses which are propagated down one or more conducting wires of the electric fence. When an animal touches a conducting wire, a path to ground is created through the animal. A portion of the electrical pulses pass through the animal to ground and quickly attracts the animal's attention. Advantageously, electrical fences, unlike conventional fences, do not need to strong enough to withstand an animals attempts to push through it. This advantage allows electric fences to be designed and constructed more simply than conventional fences. As a result, less materials may be required and less maintenance may need to be performed than would be required for a conventional fence. This may often result in a significant cost savings over conventional fences. Thus, electric fences are favored by many landowners and have become increasingly popular.

Unfortunately, if an electric fence does break, a significant portion of the length of the fence may be de-electrified. This renders the entire de-electrified portion of electric fence, which is not designed to withstand the force of an animal pushing against it, virtually useless. Thus, an electric fence must be monitored closely and a fence break must be fixed repaired as soon as possible.

The most straightforward method of monitoring an electric fence is to manually inspect the electric fence on a regular basis to verify that it is in working order. However, many electric fences are installed over rough terrain or over-grown areas which make it difficult to access portions of the fence for inspection. Moreover, the length of electric fences may extend thousands of feet or even miles, making the process of inspecting each point on such a fence exceedingly time-consuming. Thus, a need exists for a monitoring system which automatically alerts a user to a failure in an electric fence without requiring him to perform a manual inspection of the fence.

One technique employed by a prior art system, uses a monitoring device consisting of a voltage and current sensing devices, which are located in close proximity to the fence energizer, to monitor the electrical activity on the fence. If the voltage reading falls out of a specified range or the current reading falls rapidly, the sensing devices trigger an alarm. This technique attempts to simulate conditions at the far end of the electric fence by adjusting the readings based on the length of the fence. Unfortunately, the accuracy, flexibility and dependability of this system suffer because there are no sensing devices located at remote points of the electric fence. Further, such a system requires that the monitoring device be tuned to ensure that the system works accurately when the system is installed or modified.

Another technique is to position a transponder at the far end of an electric fence to: (a) receive the high-voltage electrical pulses which are propagating through the conducting wire; (b) generate a return pulse; and (c) transmit the return pulse back over the conducting wire to a digital analyzer located adjacent to the energizer. Unfortunately, this technique is only able to monitor a single location. This makes it difficult to localize the condition causing the actual problem. In addition, the transponder sends and receives the electrical pulses through the conducting wire of the fence, which is a relatively unreliable medium.

Another technique is to use a single receiver/monitor located in close proximity to the energizer, and multiple responders. Separate responders are placed at each branch of an electric fence. This technique allows each branch of the fence to be monitored simultaneously. Each responder receives the high-voltage electrical pulses over the conducting wire and periodically generates a return pulse based on conditions associated with the received pulses. Each responder delays a specific amount of time before transmitting its return pulse over the conducting wire to the receiver/monitor. Using separate circuits for each responder, the receiver/monitor discriminates between the various return pulses by the amount of time that elapses between the energizer pulses and the responder return pulses. Thus, changes in electrical conditions in a particular branch of the electric fence will effect the generation of the corresponding responder's return pulse, and delays in the generation of that return pulse are detected by the receiver/monitor. This technique allows the receiver/monitor to isolate a problem to a particular branch; however, the fence must be manually inspected to pin point the source of the problem. Further, the number of responders which may be used in this technique is limited by the size of the receiver/monitor because separate circuits are required for each additional responder. In addition, as the number of responders increases and the complexity of the fence system increases, the use of signaling techniques utilizing only the conductor wire of the electric fence becomes less and less workable, as multiple signals generated by additional responders attempt to use the same low quality transmission line over greater and greater distances. Finally, the installation or modification of system employing this technique requires that the responders and the receiver/monitor to be tuned to ensure that the system works accurately.

Thus, a need exists for an electric fence monitoring system that allows the use of multiple remote sensors spread strategically over the entire fence system, the reliability of which is not affected when additional sensors are added, and which may be more easily installed or modified by a user.

SUMMARY OF THE INVENTION

Advantageously, the present invention allows one or more electrical conditions of an electric fence system to be checked using wireless communication.

Also advantageously, the present invention allows one or more electrical conditions of an electric fence system to be checked only when a request is made by a monitor.

Also advantageously, the present invention allows a request for information about one or more electrical conditions of an electric fence system to be relayed from a monitor to a first remote unit and from the first remote unit to a second remote unit, and for data related to the electrical condition of the electric fence to be relayed from the second remote unit to the first remote unit and from the first remote unit to the monitor.

Also advantageously, the present invention allows a coded page to be sent to a user's pager unit identifying the location and the type of a failure in the electric fence system.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

In accordance with the teachings of the present invention, an electric fence monitoring system comprises a monitor and one or more remote sensors together with an electric fence system. Each remote sensor is positioned at a particular point along the electric fence system and is capable of taking a reading of the electrical condition of the fence at that point. The monitor and remote sensors are each equipped with a transceiver, and the various transceivers communicate with each other in order to relay information about the readings taken by the sensors to the monitor. The monitor, which is positioned in a location convenient to the user, is capable of analyzing the readings transmitted by the remote sensors to determine if an electrical problem exists with the electric fence system. If a problem is detected, the monitor is capable of alerting the user through the use of an audible alarm or through the use of a telephonic interface to send a page to the user. Such a page provides the user with enough information for him to identify the nature of the problem and to proceed directly to the location where the problem occurred.

BRIEF DESCRIPTION OF THE DRAWINGS

FIG. 8 illustrates an example of a request message that can be used in an exemplary embodiment of the present invention.

FIG. 9 is a diagram of a data message for use in the electric fence security system of FIG. 1.

FIG. 10 is a flowchart illustrating the operation of a user interface module stored in the monitor of FIG. 3

FIG. 11 illustrates an example of a pager code for use in the electric fence security system of FIG. 1.

DETAILED DESCRIPTION OF EXEMPLARY EMBODIMENTS

Figure 1:
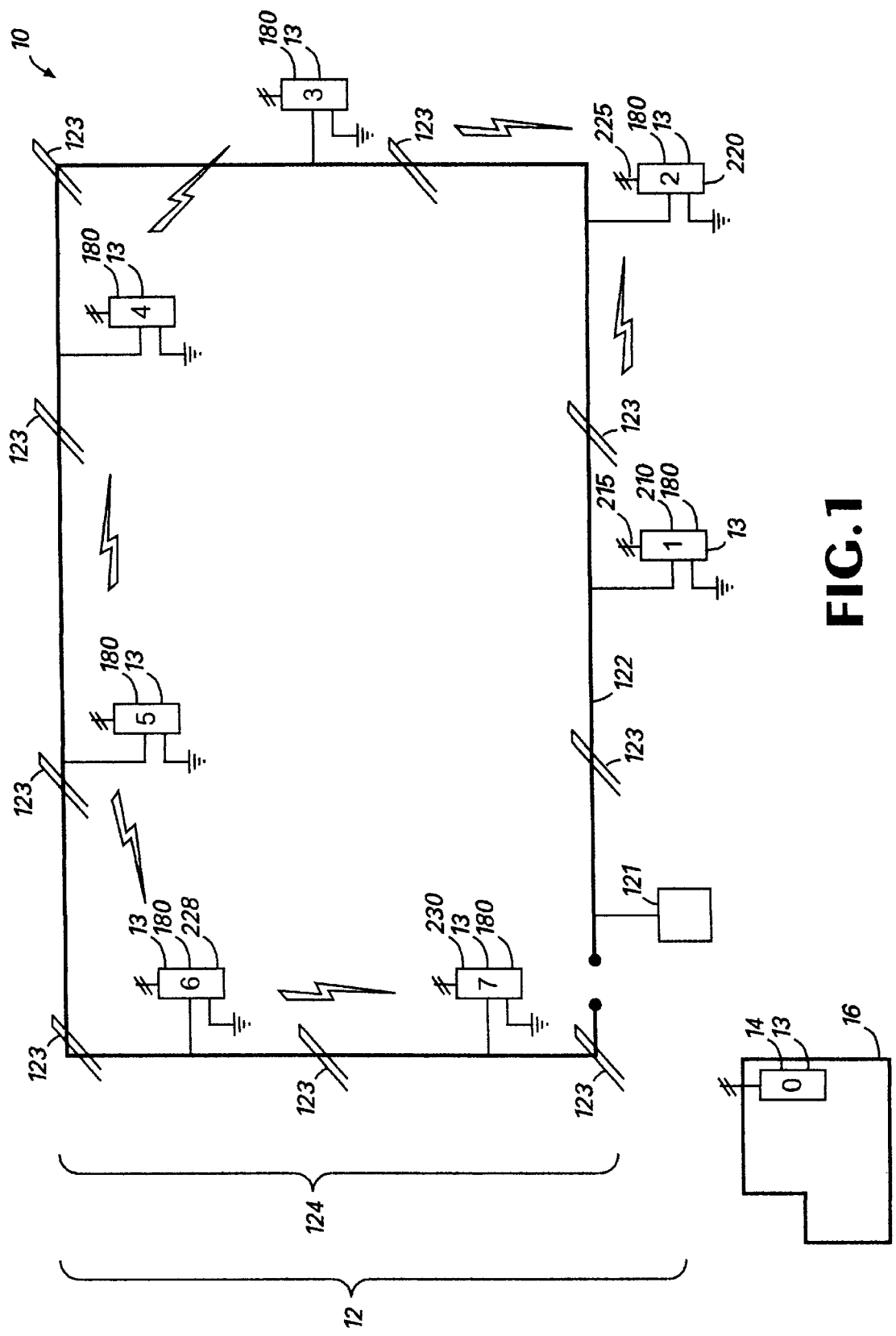
FIG. 1 is a block diagram of an electric fence system that provides an exemplary environment for various embodiments of the present invention.

FIG. 1 is a block diagram of an electric fence security system that provides an exemplary environment for various embodiments of the present invention. The electric fence security system 10 includes an electric fence system 12 and an electric fence monitoring system 13. The electric fence system 12 comprises an exciter 121, one or more conductors 122, and conductor supports 123 such as, a series of fence posts. The conductors 122 and the conductor supports 123 form an electric fence 124. The exciter 121 sources an electric current, having a voltage potential, that passes through the conductors 122. When an object, such as an animal, touches one of the conductors 122 while also touching the ground, an electrical path is created between the touched conductor 122 and the ground. This electrical path allows current to flow from the conductor to ground through the object. The voltage potential is selected to be at a level to ensure the delivery of an uncomfortable shock to an animal that touches the fence, but not at a level that would cause death or serious injury. Such an electric fence system provides an effective means for retaining animals in or preventing animals from entering a particular area of land.

Figure 2:
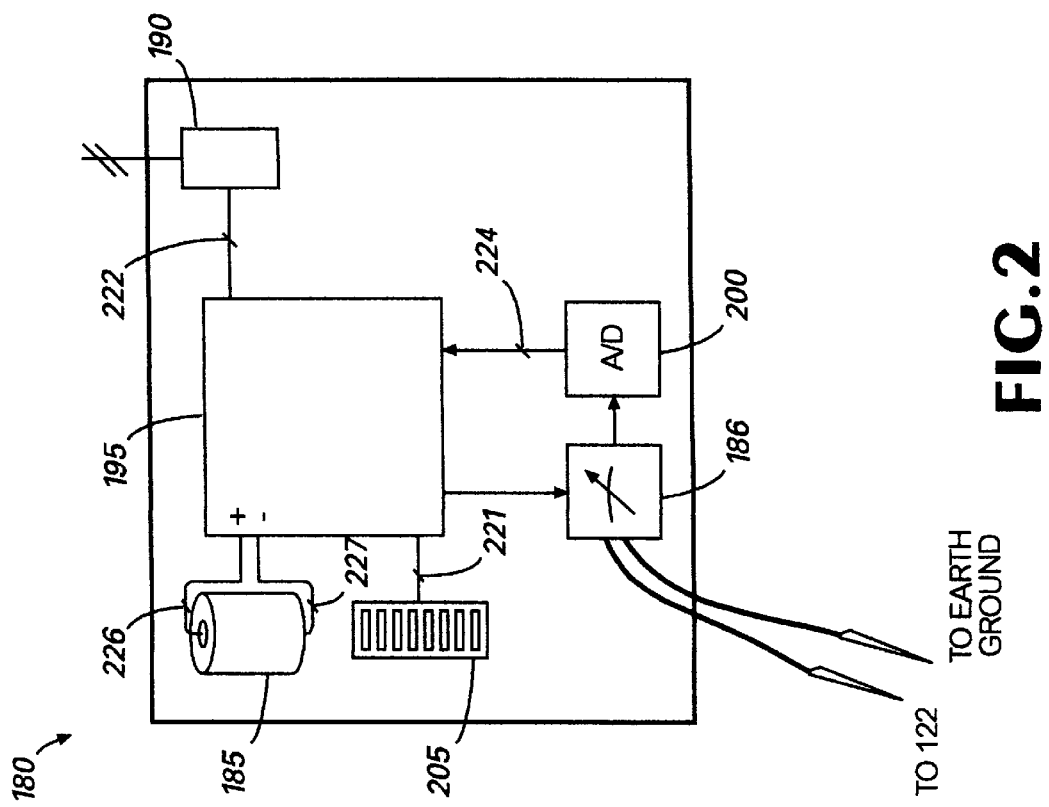
FIG. 2 is a block diagram of an exemplary remote unit suitable use in the exemplary electric fence system of FIG. 1.

The electric fence monitoring system 13 includes a monitor or monitoring unit 14 and one or more remote units 180. The remote units 180 are positioned at various points along the electric fence 124 and are electrically coupled between the conductors 122 and the ground. FIG. 2 is a block diagram of an exemplary embodiment of a remote unit suitable for use in the exemplary environment of FIG. 1. Each remote unit 180 includes a power source 185, a sensor 186, a remote unit transceiver 190, a programmable interface circuit ("PIC") 195, an analog-to-digital ("A/D") converter 200 and an identifier input device 205 to allow an address to be assigned to the remote unit 180. The output of the power source 185 is connected across positive 226 and negative 227 supply terminals of the PIC 195. The PIC 195 is coupled to the identifier input device 205 over interface 221. In an exemplary embodiment, identifier input device 205 is a dip switch and interface 221 is a parallel port for reading the state of the dip switch. The PIC 195 is in communication with the remote unit transceiver 190 over interface 222. The sensor 186 is connected across a conductor 122 of the electric fence 124 (shown in FIG. 1) and earth ground. In an exemplary embodiment, the sensor 186 measures the voltage potential between the conductor 122 and earth ground and provides and analog signal, representative of the measured voltage potential, as an output signal 223. The A/D converter 200 can be used to convert the analog output signal 223 into a digital signal and provide the digital signal to an input of the PIC 195. It should be understood that various embodiments may be used to detect the voltage potential of the conductor 122 or the current flowing through the conductor 122 and providing an input signal, representative of the voltage potential or current to the PIC 195. The use of sensor 186 to measure the voltage potential and A/D converter 200 represent only one possible embodiment. The PIC 195 includes remote unit module 202, that controls the operation of the remote unit. The remote unit module 202 will be described in more detail in conjunction with the description of FIG. 7.

Figure 3:
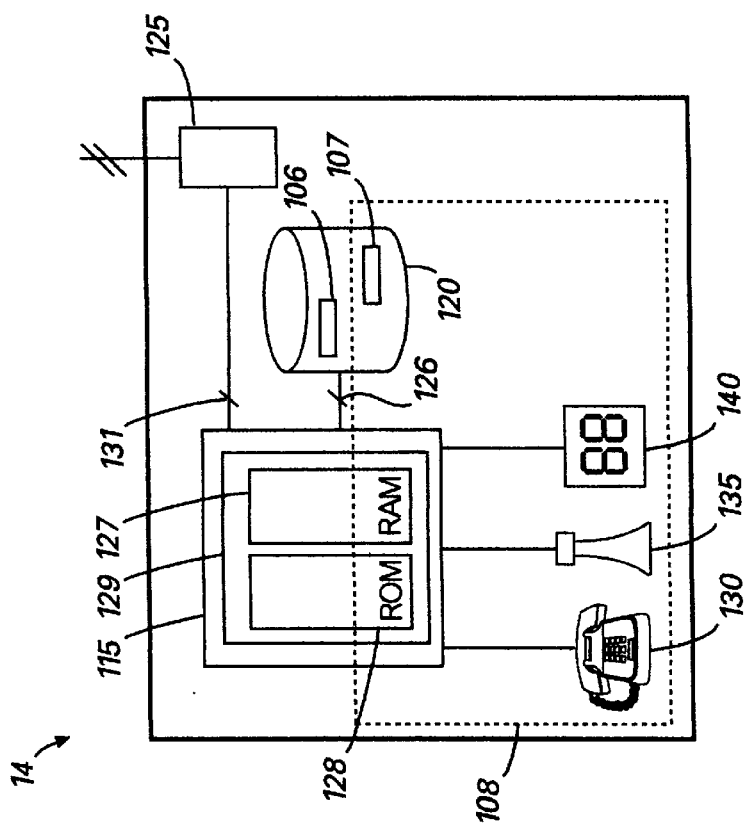
FIG. 3 is a block diagram of an exemplary monitor suitable for use in the exemplary electric fence system of FIG. 1.

Returning to FIG. 1, the monitor 14 may be positioned at any location desired by the user subject to certain the requirements described below. The monitor 14 is typically placed in a structure 16 such as a house or a barn where it can be easily accessed by an operator or user. FIG. 3 is a block diagram of an exemplary monitor suitable for use in the exemplary electric fence system of FIG. 1. The monitor 14 includes a processing unit ("PU") 115 that is able to read, interpret and perform actions based on software instructions. The PU 115 includes a memory module including RAM 127 and ROM 128. The ROM 128 contains software instructions necessary to define the basic input and output system ("BIOS") of the PU 115 as well as any necessary bootstrap programs or the like. The PU 115 interfaces over a system bus 126 to a disk storage medium 120 such as, a CDROM, a hard drive or a floppy diskette. The disk storage medium 120 provides storage for a control module 106 and a user interface module 107, each of which will be describe in more detail below. In operation, the PU 115 loads instructions from modules (i.e., control module 106) into RAM 127 and executes the instructions.

The PU 115 interfaces to a monitor transceiver 125 over an interface 131. In various embodiments, the monitor 14 may include one or more of the following interfaces: (a) a telephone interface 130; a speaker, buzzer or other audible alarm interface 135, and an LED, CRT monitor or other visual interface 140.

As mentioned above, the PU 115 processes a set of modules which are stored in the memory 120. These modules include the control module 106 and the user interface module 107. The user interface module and the various devices for communicating with a user are sometimes referred to as the user interface 108.

The monitor 14 and the remote units 180 must be capable of communicating with each other using the monitor transceiver 125 and the remote unit transceivers 190, respectively. In an exemplary embodiment, the transceivers transmit messages to each other over the air using radio frequency signals. Preferably, the transceivers are low-powered and transmit in a fixed frequency such as 433–463 MHz or 900 MHz, according to applicable FCC regulations, with a range of less than 1000 feet. It is within the scope of this invention, however, to use higher-powered transceivers which may broadcast in other frequency ranges, or are adjustable between different frequencies, over distances of many miles. In another embodiments, the monitor transceiver 125 and the remote unit transceivers 190 can communicate over wired connections including a dedicated transmission line that runs between each of the remote units 180 and the monitor 14 or by utilizing the conductor 122 of the electric fence 124. In yet another embodiment, the monitor transceiver 125 and the remote unit transceiver 190 can communicate through infrared transmission signals.

The placement of the monitor 14 and the remote units 180 is dictated by the transceivers and the method of communications employed by the system. For instance, if infrared communications are used, the transceivers must be aligned and within the line of site of each other. On the other hand, if radio frequency communications are used, the transceivers simply need to be within range of each other.

In an exemplary embodiment, the remote units 180 are placed in a sequence. A first remote unit 210 and the monitor 14 are positioned such that a first remote unit transceiver 215 and the monitor transceiver 125 can establish and maintain reliable communications. If a second remote unit 220 is used, it is positioned relative to the first remote unit 210 such that a second remote unit transceiver 225 and the first remote unit transceiver 215 can establish and maintain reliable communications. Each additional remote unit 180 which is used must be placed close enough to the previous remote unit 180 in the sequence for its remote unit transceiver 190 to communicate with that of the previous remote unit 180.

Figure 4:
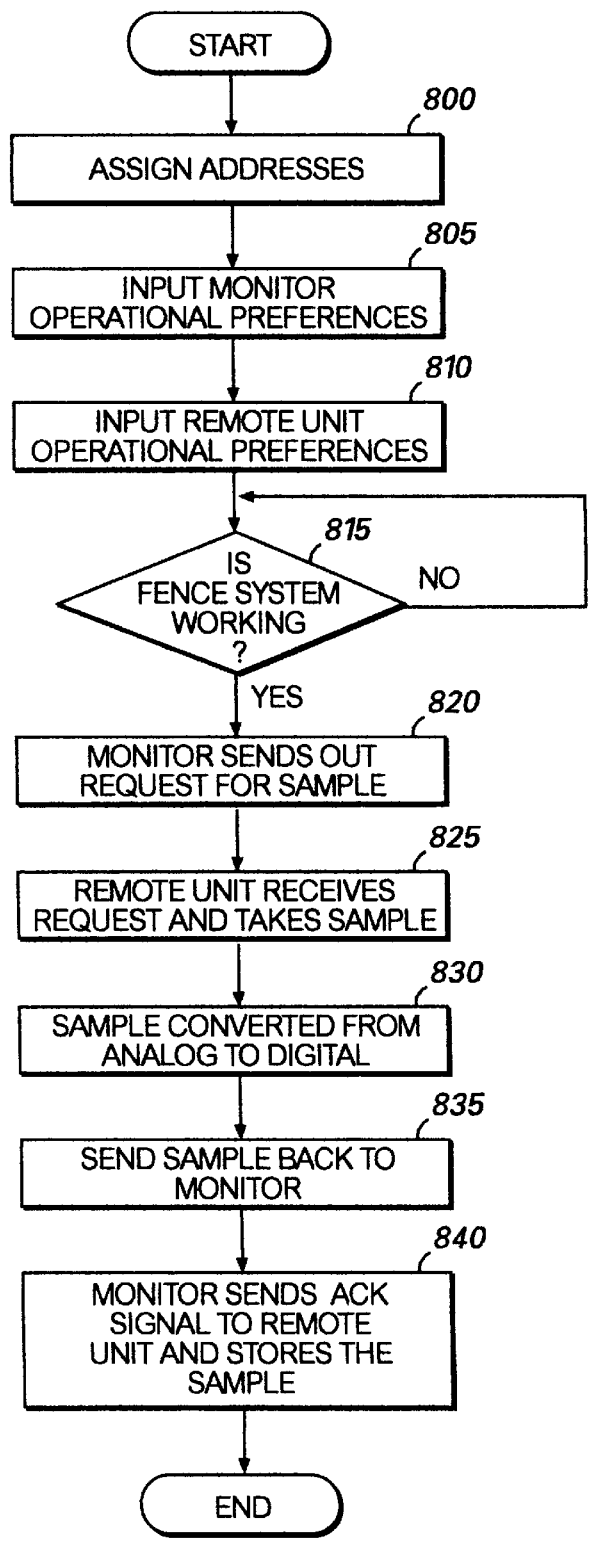
FIG. 4 is a flowchart illustrating the set up and initialization process of the electric fence security system of FIG. 1.

FIG. 4 is a flowchart illustrating the steps required in setting up and initializing an exemplary electric fence system employing the monitoring system of the present invention. At step 800, each remote unit 180 assigned and programmed with a unique identifier using the identifier input device 205. In an exemplary embodiment, the identifier is input into a remote unit 180 via a set of dip switches. In an alternate embodiment, a multi-purpose keypad may be used to input the identifier. Other methods for inputting the assigned addresses may also be used such as fused links, values stored in ROM or other types of non-volatile memory, or the like, and the present invention should not be limited to any particular method. The PIC 195 reads the assigned address over interface 221. In an exemplary embodiment, the addresses may be assigned by assigning to: the monitor 14 the address "0"; the remote unit 210 closest to the monitor 14 the address "1"; the remote unit 220 closest to the first remote unit 210 the address "2"; and so on. If the operator desires, multiple fences may be defined or a single fence may be broken into partitions. In either case, each remote unit identifier 205 would then be required to include a number identifying the fence or fence partition assigned to the remote unit 180.

At step 805, the operator provides the monitor 14 with a number of operational preferences. These preferences include defining when or how often the status of the electric fence 124 should be checked, the number of fences, the identifier of the last remote unit 230 in each fence, the maximum amount of time the monitor 14 will wait for a response after the monitor sends out a message request ("MAXTIME"), the number of times the monitor 14 will send out a request message without getting a response before it gives up ("TRYMAX"), the amount of deviation from a reference value which will trigger an alarm, the type of notification the user prefers when a problem is detected, and a telephone number for a pager unit if the user desires a coded page or a telephone call. At step 810, the operator provides each of the remote units 180 with a number of operational preferences. These preferences include the maximum amount of time the remote unit 180 will wait for a response after it sends out a message request ("MAXTIME"), and the number of times the remote unit 180 will send out a request message without getting a response before it gives up ("TRYMAX").

After the system has been set up, a reference sample is taken by the first remote unit 210 and stored by the monitor 14 for future use. This process is illustrated in steps 815–840. At step 815, the user must manually ensure that the electric fence system 12 is operating properly. Once this has been performed, processing continues at step 820. At step 820, the monitor 14 sends out a request for a sample from the first remote unit 210. At step 825, the first remote unit 210 receives the request and the first remote unit sensor 217 takes a reading of the electrical condition of the electric fence 124 at the point of the fence at which the remote unit 210 is installed. In an exemplary embodiment, the electrical condition measured by the sensor is the voltage of the fence at that point. At step 830, the measurement taken by the first remote unit sensor 217 is converted from analog to digital by the A/D converter 200. At step 835, the remote unit 210 transmits a message to the monitor 14 containing the value of the sample. At step 840, when the monitor 14 receives the message, it sends an acknowledgment ("ACK") signal back to the remote unit 210. The value of the reference sample itself is preserved by the monitor 14 to be used in conjunction with the deviation allowed from that value. Together the reference sample and the deviation allowed define a standard operating range which will be used by the system to determine if an alarm condition exists. After completing step 840, the electric fence monitoring system 13 has been initialized, it is ready to enter normal operations.

Figure 5:
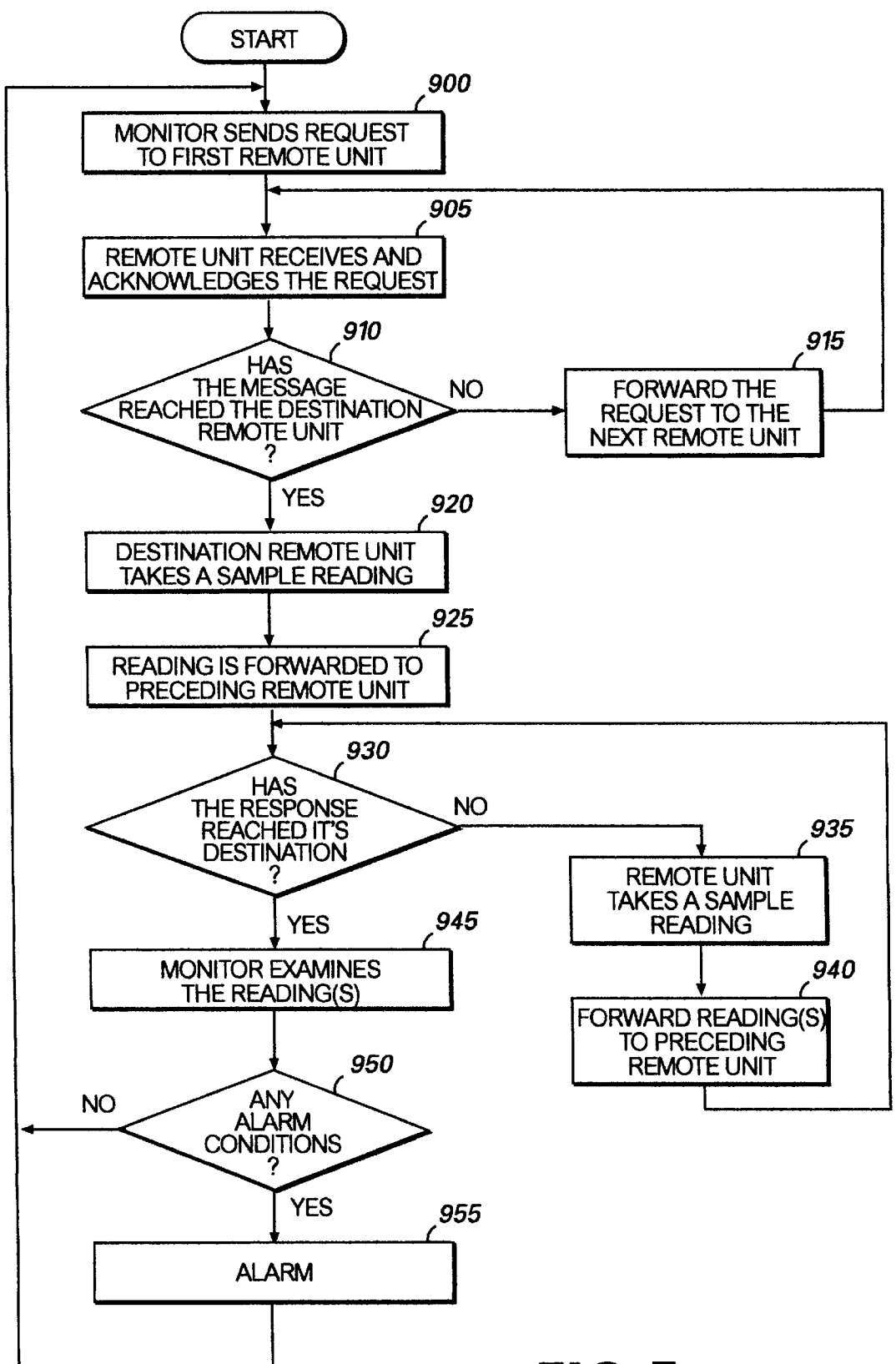
FIG. 5 is a flowchart illustrating a general overview of the normal operation of an exemplary electric fence system 13 employing an exemplary embodiment of the present invention.

FIG. 5 is a flowchart illustrating a general overview of the normal operation of an exemplary electric fence system 13 employing an exemplary embodiment of the present invention. In general, the monitor 14 checks the status of the fence 124 by gathering samples from the remote unit sensors 186. At step 900, the monitor 14 initiates this process by transmitting an information request to a destination remote unit 180. In one embodiment, the monitor 14 can transmit the information request to any remote unit in the electric fence system 13. However, in the preferred embodiment, the information request is relayed to the destination remote monitor by hopping from one remote unit to the next. Thus, the information request includes a field that contains the assigned address of the destination remote unit and the assigned address of the next-stop remote unit. In the example described, the assigned address of the destination remote unit is "7" corresponding with remote unit 230 and the address of the next-stop remote unit is "1" corresponding with remote unit 210.

At step 905, the first remote unit 210 receives and acknowledges the information request. At step 910, the PIC 195 of the remote unit 210 determines if the information request is intended for the remote unit 210 or if it is to be forwarded to a next-stop remote unit. This determination is made by comparing the assigned address of the destination remote unit to the assigned address of the receiving remote unit. If the addresses are equal, then the information request has arrived at the destination remote unit. If the addresses are not equal, then there are additional remote units 180 in the sequence. At step 915, the first remote unit 210 modifies the next-stop field of the information request to equal the assigned address of the next remote unit 180 in the sequence and then transmits the information request. Steps 905–915 are then repeated by each remote unit 180 in the sequence until the information request reaches the destination remote unit 230.

At step 920, the information request reaches the destination remote unit 230 and the remote unit takes a sample reading of the electrical condition of the fence 124 at that location. The sample reading is then relayed back to the monitor 14 as an information response. The information response is transmitted to the monitor 14 similarly to the method used to transmit the information request to the destination remote unit 230. The destination field of the information response is set equal to the address "0" assigned to the monitor 14 and the next-stop field is set equal to the address "6" assigned to the preceding remote unit 180 in the sequence, which becomes the next-stop remote unit. At step 925, the remote unit 230 transmits the information response to the next-stop remote unit 228.

At step 930, if the address of the next-stop remote unit ("6" in the example) does not equal the destination address ("0" in the example), then processing continues at step 935. At step 935, the remote unit receiving the information response (228 in the example), takes a sample reading of the electrical condition of the fence 124 at that location. The next-step remote unit 228 then appends the sample reading to the information response, modifies the next-stop field of the information response to be equal to the assigned address of the next remote unit 180 in the sequence ("5" in the example) and, at step 940, transmits the information response. In this context, it should be understood that the next-stop remote unit could be either a remote unit 180 as that term has been previously defined or the monitor 14. Thus, steps 930–940 are repeated until at step 930 the destination address field of the information response is equal to the assigned address of the unit receiving the information response (i.e., the monitor 14 in this example). At step 945, the monitor 14 receives the information response and compares all of the values the standard operating range to identify any alarm conditions. At step 950, if an alarm condition is detected, processing continues at step 955. Otherwise, processing returns to step 900. At step 955 the monitor 14 notifies a user or operator of the existence of an alarm condition. This may be accomplished over interface 108 (shown in FIG. 3) to activate an appropriate alarm. Once the monitor finishes its analysis, processing returns to step 900.

What has been described so far is merely an overview of the communications that are carried out between the monitor 14 and the remote units 180 and between one remote unit 180 and another. A more detailed description of the communication processes will next be described. In an exemplary embodiment, all communications are wireless and are carried out using the monitor and remote unit transceivers previously described. However, it will be obvious to one of ordinary skill in the art that the following communications could also be carried out using dedicated wires or using the wire of the electric fence 124 itself using a well-known pulse technology.

Figure 6A:
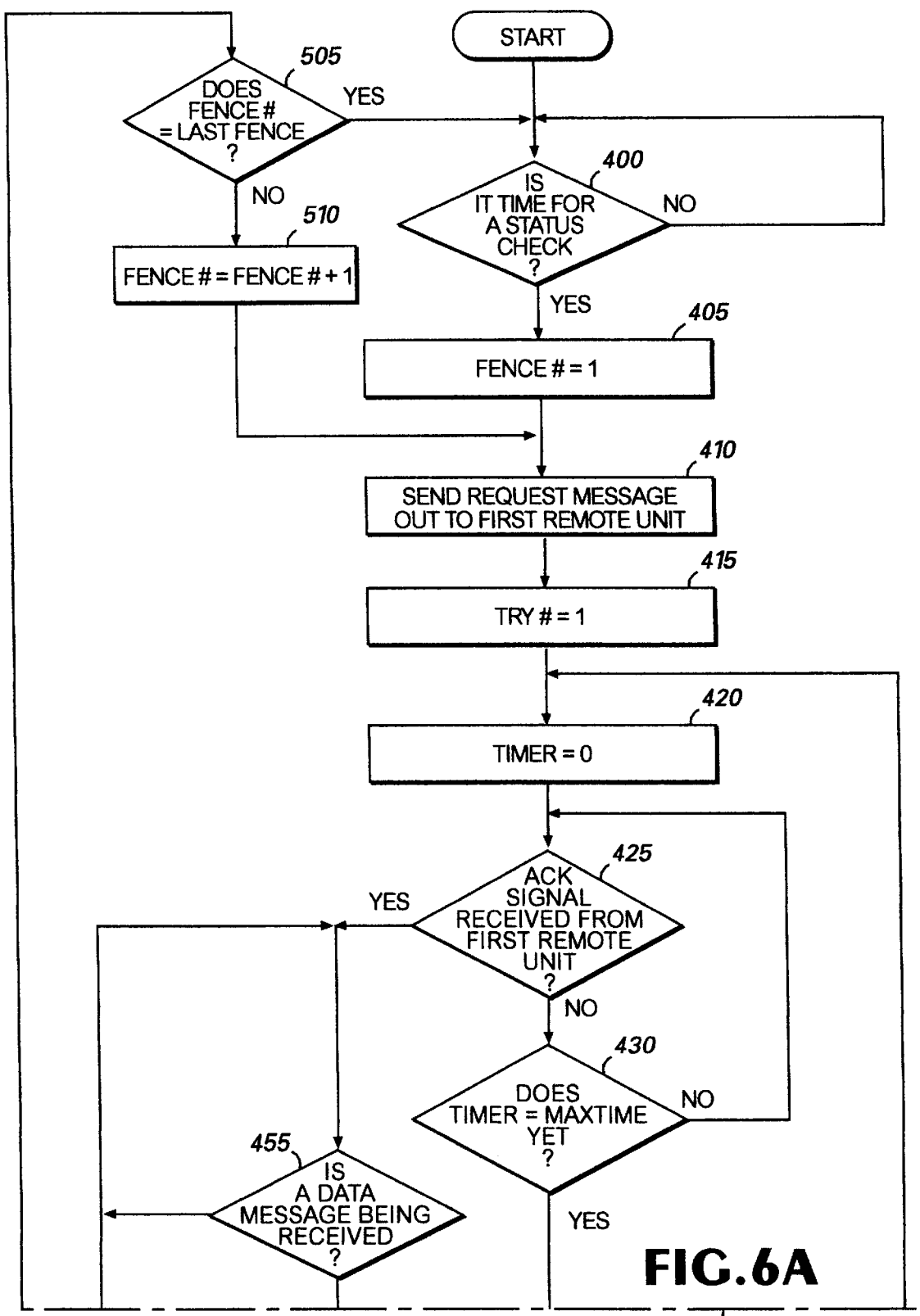
FIG. 6 is a flowchart illustrating the operation of a control module stored in the monitor of FIG. 3.
Figure 6B:
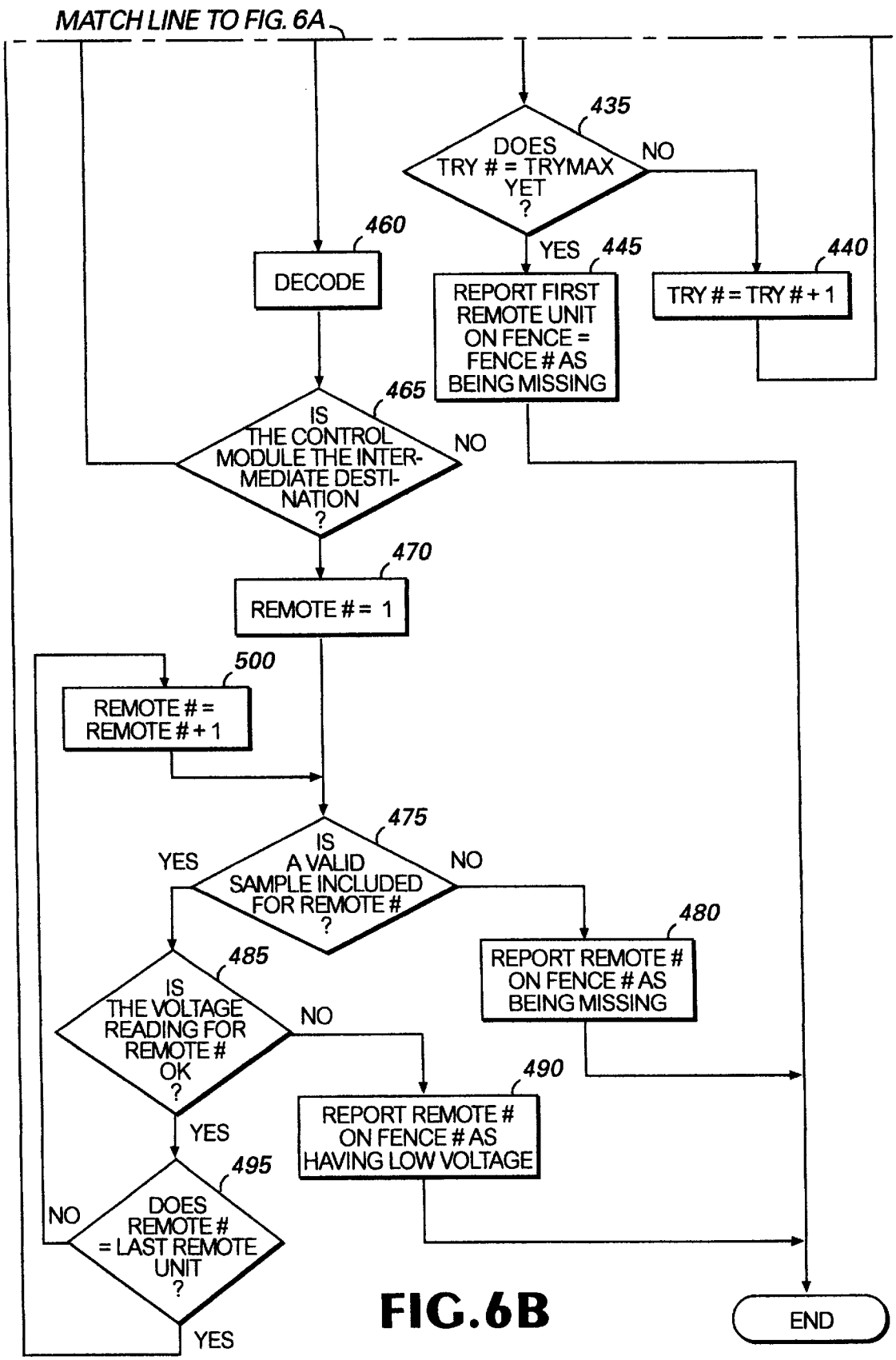

FIG. 6 is a flowchart illustrating the normal operation of the control module 106. At step 400, the control module 106 determines if it is time to check the status of the remote units 180. In an exemplary embodiment, the monitor 14 checks the status of the remote units 180 at regular intervals, and the interval amount is predefined by the user. In an alternate embodiment, the monitor 14 checks the status of the remote units 180 at specific times which may be predefined by the user. In another alternate embodiment, the monitor 14 checks the status of the remote units 180 in response to a user or operator request.

At step 400, if the control module 106 determines that it is time to check the status of the remote units 180, the control module 106 proceeds to step 405 to initialize the current fence being checked to the first fence. At step 410, the control module 106 directs the monitor transceiver 125 to transmit an information request to be received by the first remote unit 210 of the current fence.

FIG. 8 illustrates an example of a request message that can be used in an exemplary embodiment of the present invention. Each request message 240 includes a fence identifier 235, a final destination portion 245 which contains the address assigned to the remote unit 180 which has been defined as the last remote unit 230 (or a destination remote unit) in the sequence. It should be noted that the destination remote unit does not have to be the last remote unit in the sequence. For instance, during the initialization process previously described, the destination unit is the first remote unit in the sequence. Each information request message further includes an intermediate destination portion (or next-stop) 250 which contains the address assigned to the monitor 14 or the next remote unit 180 which is supposed to receive and respond to the message 240. FIG. 8 illustrates an example information message for fence number 01, wherein the intermediate destination of the information request is 001 and the destination of the information request is 007 corresponding to the last remote unit 230 in the predefined sequence.

At step 415, a counter is initialized to indicate the number of times the monitor 14 has attempted to contact the first remote unit 210, and at step 420 a timer is initialized to indicate how much time has elapsed since the monitor 14 last sent out a request message 240. At step 425 the control module 106 checks to see if an acknowledgment ("ACK") has been received from the first remote unit 210 in response to the request message 240 sent out by the monitor 14.

The operation of the remote units 180 and the process by which the remote units 180 send out such an ACK signal is described below and illustrated in FIG. 7. If an ACK is not received processing continues at step 430. If an ACK is received, processing continues at step 455.

At step 430, the MAXTIME variable is examined to determine if a time-out condition has occurred. If a time-out has not occurred, processing returns to step 425. If a time-out has occurred, processing continues at step 435 then the control module 106 proceeds to step 435. At step 435, if the number of attempts to contact the first remote unit 210 does not exceed the maximum number of attempts allowed ("TRYMAX") then the current attempt counter is incremented at step 440 and processing returns to step 420. If, on the other hand, the number of attempts does exceed TRYMAX, then at step 445 the control module 106 stops and reports the current remote unit 180 on the current fence to the user interface module 107 as failing.

Returning to step 425, if the monitor 14 does receive an ACK signal, the control module 106 proceeds with steps 455–465 to wait for a data message 260 to be sent out by the first remote unit 210. At step 455, the control module 106 waits until the monitor transceiver 125 detects the reception of an information response 255. The format of an information response 255 is illustrated in FIG. 9. Like a request message 240, each data message 255 includes a fence identifier 235, a final destination portion 245 which contains the identifier of the monitor 14, which is always defined as the unit 0 in the sequence. Each data message 255 further includes an intermediate destination portion 250 which contains the identifier of the monitor 14 or remote unit 180 which is supposed to respond to the message. In addition, each data message 255 also includes a data portion 260 which represents sample readings taken by the remote units 180. Once a data message 255 is detected, the control module 106 decodes the message 255 at step 460 and checks to see if the intermediate destination of the message 255 is the monitor 14 at step 465. If the monitor 14 is not the destination of the message 255, then the control module 106 returns to step 455 to await another message.

At step 465, if the monitor 14 is the intended destination of the data message 255, then the control module 106 proceeds to steps 470–500 to check the data message 255 for a valid sample from each remote unit 180. The monitor 14 begins this process at step 470 by initializing a counter which indicates that the current remote unit 180 being checked is the first remote unit 210. At step 475, the control module 106 examines the data message 255 for a valid sample from the current remote unit 180. If no sample is included for that remote unit 180, then at step 480 the control module 106 stops and reports the current remote unit 180 on the current fence to the user interface module 107 as being missing. If at step 475 a valid sample has been included for the current remote unit 180, at step 485, the control module 106 checks the value of the sample to see if it is within the standard operating range described previously. In an exemplary embodiment, the sample value is an 8-bit binary number representing a voltage as measured by the current remote unit 180. If the sample value is not within the standard operating range, then at step 490 the control module 106 stops and reports the current remote unit 180 on the current fence to the user interface module 107 as reporting an electrical problem.

If at step 485 the value of the sample is within the standard operating range, and at step 495 if there are other remote units 180 to be checked, the current remote unit 180 is incremented at step 500 and steps 475–490 are repeated. If at step 495 the last remote unit 230 has been checked, then at step 505 the control module 106 checks to see if there are other fences to be checked. If there are, the current fence is incremented at step 510. If all of the remote units 180 on all of the fences have been checked, the control module 106 returns to step 400 to wait until another status check is to be made.

Figure 7A:
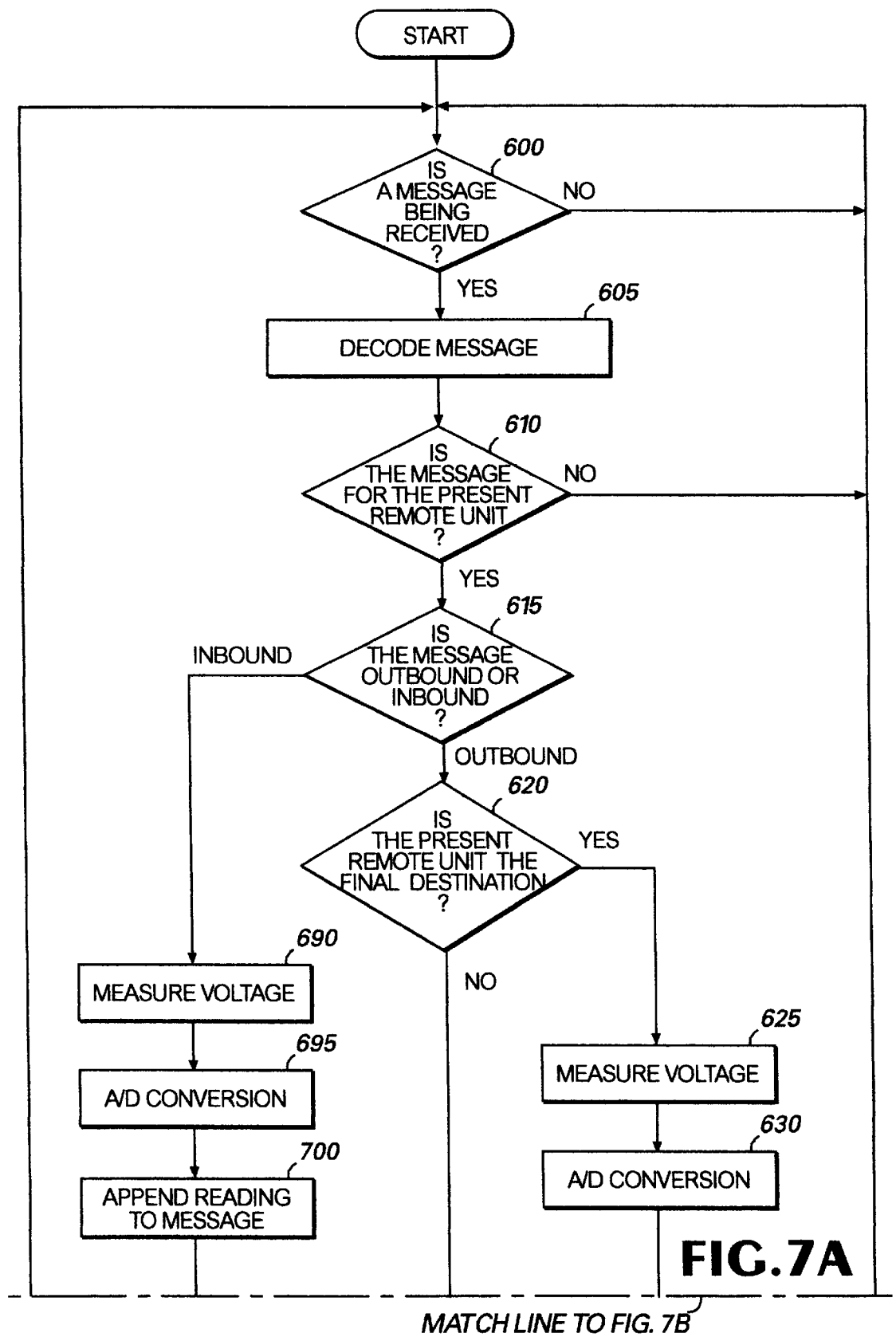
FIG. 7 is a flowchart illustrating the operation of an exemplary remote unit module within an exemplary remote unit.
Figure 7B:
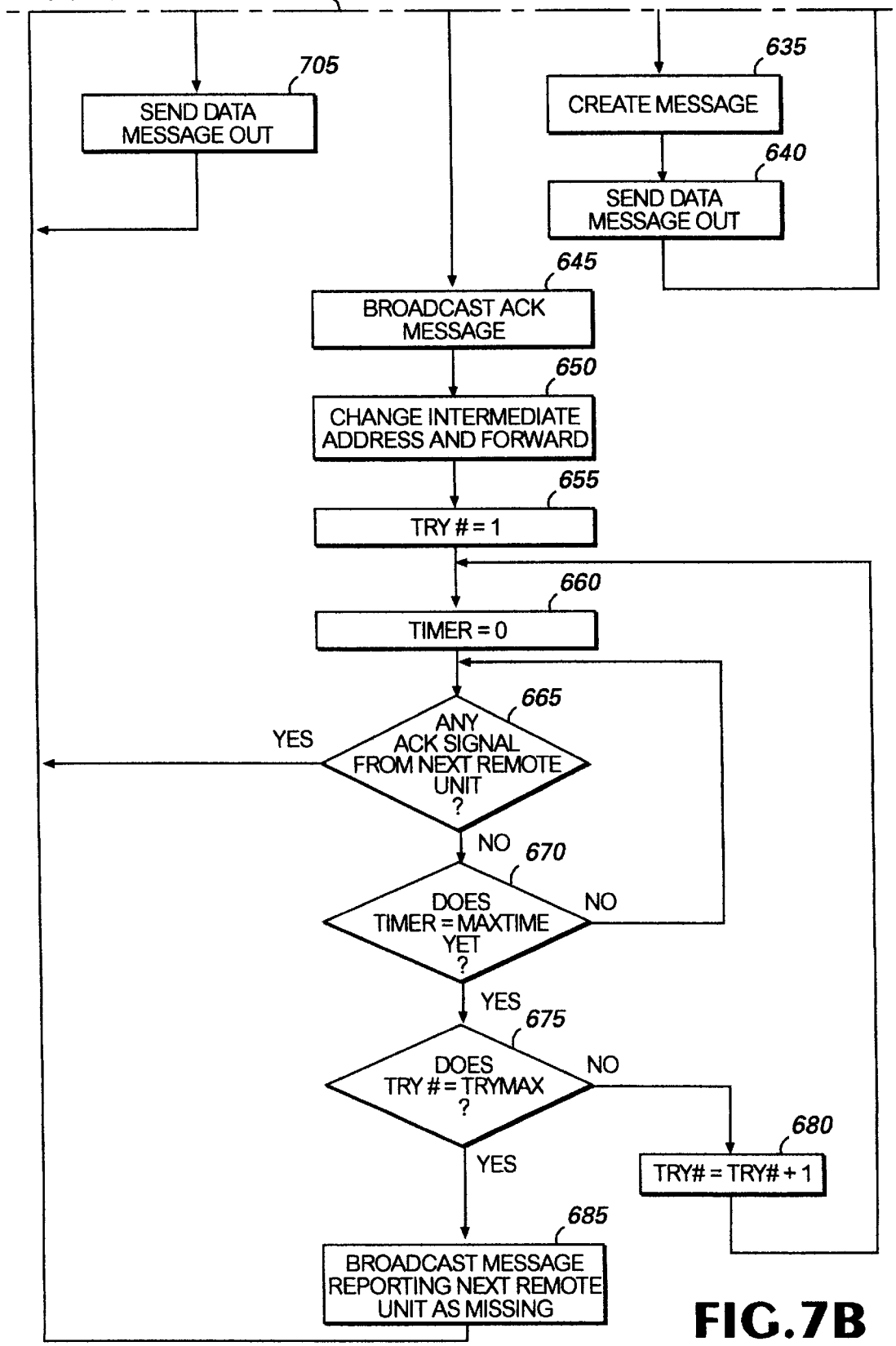

FIG. 7 is a flowchart illustrating the operation of an exemplary remote unit module within an exemplary remote unit. Separate remote unit modules 202 are in operation on each remote unit 180 simultaneously, but because they are identical, only the operation of one, sometimes referred to as the present remote unit or the present remote unit module, will be described.

At step 600, each remote unit module 202 waits for an message to be received. The remote unit module 202 decodes the i message at step 605 and determines at step 610 whether the message is being sent to the present remote unit 180 or not by looking at the intermediate destination portion 250 of the message. If not, the remote unit module 202 returns to step 600 to await the reception of another message. If at step 610 the message is intended for the present remote unit 180, the remote unit module 202 proceeds to step 615 to determine if the message is outbound from the monitor 14 (an information request message 240) or inbound toward the monitor (an information response message 255). If the message is outbound, the remote unit module 202 examines at step 620 the final destination portion 245 of the information request 240 to determine whether the present remote unit is the final destination of the information request 240. If it is, then at step 625 the remote unit module 202 directs the sensor 186 to measure the electrical condition of the electric fence 124. In an exemplary embodiment, the electrical condition measured by the sensor 186 is the voltage. Next, at step 630, the measurement taken by the sensor 186 is converted from analog to digital by the A/D converter. It should be noted that the measurement does not have to be converted to digital but rather could be used to modulate the response signal directly in some embodiments. At step 635 the remote unit module 202 creates a new data message 255, as shown in FIG. 9. When the last remote unit 230 creates the data message 255, the only sample included is that taken by the last remote unit 230, but samples taken by other remote units 180 may be added as the data message 255 is passed back to the monitor 14. Thus, in FIG. 9, the fence identifier 235 is 01, so the status of the first fence is being checked. The intermediate destination of the data message 255 is 006, so the message 255 is directed to the sixth remote unit in the predefined sequence. The final destination of the data message 255 is 000, which indicates that the message 255 is destined for the monitor 14. The sample value is 128. Once the new message 255 is created, then at step 640 the remote unit module 202 sends the message 255 out and returns to step 600 to await the reception of another message.

If at step 620 the remote unit module 202 determines from the final destination that the message is an information request 240 for a sample from some other remote unit 180, the remote unit module 202 directs the remote unit transceiver 190 to send an ACK signal back to the source of the outbound request at step 645. At step 650 the remote unit module 202 changes the intermediate destination of the outbound request 240 to the identifier of the next remote unit 180 in the sequence and then attempts to send the request 240 to that remote unit 180.

The actions taken next at steps 655–680 by the remote unit module 202 are identical to the actions taken by the control module 106 at steps 415–440. At step 655, a counter is initialized to indicate the number of times the present remote unit has attempted to contact the next remote unit, and at step 660 a timer is initialized to indicate how much time has elapsed since the present remote unit last sent out the request message 240. At step 665 the remote unit module 202 checks to see if an ACK signal has been received from the next remote unit in response to the request message 240. If at step 670 no ACK signal has been received by the present remote unit 180 within a predefined amount of time ("MAXTIME"), then the remote unit module 202 proceeds to step 675. If at step 675 the number of attempts to contact the next remote unit 180 does not exceed the maximum number of attempts allowed ("TRYMAX") then the current attempt counter is incremented at step 680 and the remote unit module 202 repeats steps 660–675. If, on the other hand, at step 675 the maximum number of attempts to contact the next remote unit 180 has been reached, the remote unit module 202 stops and at step 685 broadcasts a message reporting that the next remote unit 180 failed to respond, and the remote unit module 202 returns to step 600 to await the reception of another message.

If at step 615 the remote unit module 202 determines the message received is an inbound data message 255, the remote unit module 202 directs the sensor 186 to measure the electrical condition of the electric fence 124 at step 690. In a preferred embodiment the electrical condition measured by the sensor 186 is the voltage. Next, at step 695, the measurement taken by the sensor 186 is converted from analog to digital by the A/D converter 195. At step 700 the remote unit module 202 appends the sample value to the inbound data message 255 and changes the intermediate destination to the remote unit in the sequence immediately prior to the present remote unit. At step 705 the remote unit module 202 sends the modified data message 255 out and returns to step 600 to await the reception of another message.

FIG. 10 is a flowchart illustrating the operation of the user interface module 107. At step 1000, the user interface module 107 waits for the control module 106 to notify it of a problem. If no notification is being received, then at step 1005 the user interface module directs the LED display 140 to display a message indicating that the electric fence system is working properly. If, on the other hand, the control module 106 notifies the user interface module 107 of a problem, then at step 1010 the user interface module 107 determines which fence 124 and remote unit 180 are reporting the problem and whether the problem is a missing sensor or an electrical problem. Next, at step 1015 the user interface module 107 determines whether the user has set an operational preference for an audible alarm to be activated, and if so the user interface module directs the monitor speaker 14C to sound at step 1020. Next, at step 1025 the user interface module 107 determines whether the user has set an operational preference for a coded page to be sent out. If so, the user interface module 107 generates a pager code 265 at step 1030.

FIG. 11 illustrates an example of a pager code 265. Each pager code 265 includes a problem indicator field 270, a fence identifier field 275, a remote unit identifier field 280, and a problem type field 285. The contents of the problem indicator field 270 are the same for all pager codes 265 and function to alert the user that the number being received on the pager unit represents a code for a problem with an electric fence 124. The fence identifier field 275 and the remote unit identifier field 280 identify the fence and remote unit associated with the problem. The problem type field 285 indicates the type of problem being reported, with 0 representing an electrical problem such as a low voltage and 1 representing a missing sensor. Thus, in the example shown in FIG. 11, the problem indicator field 270 contains the value 911 which alerts the user that there is a problem with an electric fence 124. The fence identifier field 275 and the remote unit identifier field 280 indicate that the problem is with remote unit 007 on fence 01, and the problem indicator field 285 indicates that that remote unit is reading a low voltage.

Next the user interface module 107 retrieves the telephone number of the user's pager unit from the memory 120, passes the code and the telephone number to the telephone interface 130 at step 1035 and directs the telephone interface 130 to send the code to the user's pager unit via a conventional public switched telephone network at step 1040. Finally, at step 1050 the user interface module directs the LED display 140 to display the fence number and the remote unit number which is reporting the problem and what type of problem is being reported. The user interface module 107 then returns to step 1000 to await another problem notification from the control module 106.

Whereas this invention has been described in detail with particular reference to exemplary embodiments, it is understood that variations and modifications can be effected within the spirit and scope of the invention, as described herein before and as defined in the appended claims. The corresponding structures, materials, acts, and equivalents of all means or step plus function elements in the claims below are intended to include any structure, material, or acts for performing the functions in combination with other claimed elements as specifically claimed.

We claim:

1. A wireless electric fence monitoring system comprising:

(a) a remote unit positioned at a remote point of an electric fence, said remote unit comprising:
a sensor coupled to said electric fence and operable to detect a particular electrical condition of said electric fence at said remote point;
a first wireless receiver for receiving an information request related to said particular electrical condition;
a first wireless transmitter for transmitting, in response to said information request, an information response related to said particular electrical condition; and
a first processor operable to obtain said detected particular electrical condition from said sensor in response to receiving said information request at said first wireless receiver and to provide said detected particular electrical condition to said first wireless transmitter for said information response; and (b) a monitor, in wireless communication with said remote unit, comprising:
a second wireless transmitter for transmitting said information request to said remote unit;
a second wireless receiver for receiving said information response from said remote unit; and
a second processor for processing the information response.

2. An electric fence monitoring system comprising:

(a) a plurality of remote units positioned at separate remote points of an electric fence, each said remote unit comprising:

a sensor coupled to said electric fence and operable to detect a particular electrical condition of said electric fence at a particular remote point;

a remote unit wireless receiver for receiving signaling messages, one of said signaling messages including an information request related to said particular electrical condition;

a remote unit wireless transmitter for transmitting signaling messages, in response to receiving said information request, said signaling messages including an information response related to said particular electrical condition; and a remote unit processor operable to obtain said detected particular electrical condition from said sensor in response to receiving said information request at said remote unit wireless receiver and to provide said detected particular electrical condition to said remote unit wireless transmitter for said information response; and (b) a monitor unit, in communication with each of said remote units, comprising:

a monitor unit wireless transmitter for transmitting signaling messages to said plurality of remote units, said signaling messages including said information request;

a monitor unit wireless receiver for receiving signaling messages from a plurality of remote units, said signaling messages including said information responses; and a monitor processor for processing said information responses.

3. The electric fence monitoring system of claim 2, wherein each of said plurality of remote units and said monitor have an assigned address, each of said signaling messages includes a next-stop address portion that identifies a particular assigned address, and each said remote unit and said monitor is operable to detect said next-stop address portion of each of said signaling messages and to process one of said signaling messages only when their particular assigned address is identified by said next-stop address portion.

4. The electric fence monitoring system of claim 3, wherein each of said signaling messages includes a destination address portion that identifies an assigned address of an intended destination remote unit and each of said remote units includes a next-stop address identifier corresponding with each possible destination address, and is operable to:

examine said destination address portion of said signaling message;

identify a next-stop address corresponding with said destination address portion;

modify said next-stop address portion of said signaling message; and transmit said modified signaling message.

5. A method of detecting the occurrence of particular electrical conditions in an electric fence system, wherein the electric fence system includes a central monitoring unit with a transmitter and a receiver and a plurality of remote units positioned at various points along the electric fence, each of the plurality of remote units including a remote unit transmitter, a remote unit receiver and a sensor coupled to said electric fence, said method comprising the steps of:

(a) causing one of said sensors to sense said particular electrical conditions of said electric fence;

(b) transmitting an information response including said particular electrical conditions to a next-stop remote unit, said information response identifying said central monitoring unit as a destination for said information response and a first remote unit as said next-stop remote unit;

(c) in response to receiving said information response at said next-stop remote unit, modifying said information response to identify a next remote unit as said next-stop remote unit and transmitting said modified information response; and (d) repeating step (c) until said next-stop remote unit receiving said information response is said central monitoring unit.

6. A method detecting the occurrence of particular electrical conditions in an electric fence system, wherein the electric fence system includes a central monitoring unit with a transmitter and a receiver and a plurality of remote units positioned at various points along the electric fence, each of the plurality of remote units including a remote unit transmitter, a remote unit receiver and a sensor coupled to said electric fence, said method comprising the steps of:

(a) transmitting to a destination remote unit, an information request to obtain particular electrical conditions at a destination point of said electric fence;

(b) in response to receiving said information request at said destination remote unit, causing said sensor at said destination remote unit to sense said particular electrical conditions of said electric fence;

(c) transmitting an information response including said particular electrical conditions to said central monitoring unit;

(d) receiving said information response at said central monitoring unit; and (e) processing said particular electrical conditions in said information response.

7. The method of claim 6, wherein said step of transmitting to a destination remote unit, an information request to obtain particular electrical conditions at a destination point of said electric fence, comprises relaying an information message to said destination remote unit by performing the steps of:

(a) transmitting said information request to a next-stop remote unit, said information request identifying said destination remote unit as a destination for said information request and a first remote unit as said next-stop remote unit;

(b) in response to receiving said information request at said next-stop remote unit, modifying said information request to identify a next remote unit as said next-stop remote unit and transmitting said modified information request; and (c) repeating step (b) until said next-stop remote unit receiving said information request is said destination remote unit.

8. The method of claim 7, wherein said step of transmitting an information response including said particular electrical conditions to said central monitoring unit comprises relaying said information response to said central monitoring unit by performing the steps of:

(a) transmitting said information response to a next-stop remote unit, said information response identifying said central monitoring unit as a destination for said information response and a first remote unit as said next-stop remote unit;

(b) in response to receiving said information response at said next-stop remote unit, modifying said information response to identify a next remote unit as said next-stop remote unit and transmitting said modified information response; and (c) repeating step (b) until said next-stop remote unit receiving said information response is said central monitoring unit.

9. The method of claim 8, wherein said modifying step further comprises the steps of:

(a) causing said sensor at said next-stop remote unit to sense said particular electrical conditions of said electric fence at said next-stop; and (b) appending said electrical conditions at said next stop to said information response.

10. The method of claim 9, wherein said processing said particular electrical conditions in said information response step comprises the step matching each of said remote units with the corresponding appended particular electrical conditions it sensed.

11. The method of claim 10, wherein said information response step comprises the step conveying said electrical conditions and said matching remote units to a user by sending an electronic page signal.

12. The method of claim 9, wherein said processing said particular electrical conditions in said information response step comprises the step conveying said electrical conditions to a user by sounding an alarm.

13. The method of claim 9, wherein said processing said particular electrical conditions in said information response step comprises the step conveying said electrical conditions to a user by sending an electronic page signal.

14. The method of claim 9, wherein said processing said particular electrical conditions in said information response step comprises the step visibly conveying said electrical conditions to a user.

15. The method of claim 6, wherein said processing said particular electrical conditions in said information response step comprises the step conveying said electrical conditions to a user by sending an electronic page signal.

16. A remote unit, positioned at a particular point of an electric fence and operable within an electric fence monitoring system for monitoring and reporting particular electrical conditions of said electric fences as said particular point, said remote unit comprising:

(a) a sensor electrically coupled to a conductor of said electric fence, said sensor being operable to detect said particular electrical conditions of said electric fence at said particular point; and (b) a radio frequency transmitter coupled to said sensor, said transmitter being operable to receive information signals from said sensor, said information signals indicative of said particular electrical conditions, and to transmit radio frequency signals representative of said information signals.

17. The remote unit of claim 16, further comprising a radio frequency receiver, operable to receive a radio frequency signal representative of a request to transmit said radio frequency signals representative of said information signals, said information signals having been received prior to said reception of said request signal.

18. The remote unit of claim 16, further comprising a radio frequency receiver, operable to receive a radio frequency signal representative of a request to detect said particular electrical conditions of said electric fence and to transmit said radio frequency signals representative of said information signals, said information signals being generated by said sensor as a result of said request signal.

19. A monitoring unit, operable within an electric fence monitoring system, said monitoring unit comprising:

a radio frequency receiver, operable to receive radio frequency signals representative of information concerning particular electrical conditions of various remote points of an electric fence;

a processor, operable to interpret said information concerning particular electrical conditions and trigger an alarm condition based on predetermined parameters for said particular electrical conditions; and an alerting means for indicating said alarm condition.

20. The monitoring unit of claim 19, wherein said alerting means comprises an audible alarm.

21. The monitoring unit of claim 19, wherein said alerting means comprises a visual alarm.

22. The monitoring unit of claim 19, wherein said alerting means comprises a pager and said monitoring means is operable indicate said alarm condition by transmitting an electronic page.

23. The monitoring unit of claim 19, wherein said alerting means includes a telephone line interface and said monitoring unit is operable to indicate said alarm condition by placing an electronic page over said telephone line interface.

24. The monitoring unit of claim 19, wherein the alerting means includes a telephone line interface and said monitoring unit is operable to indicate said alarm condition by placing a call over said telephone line interface to a particular number.

25. The monitoring unit of claim 19, wherein said alerting means includes a cellular telephone transceiver and said monitoring unit is operable to indicate said alarm condition by causing said cellular telephone to place a call to a particular number.

26. An electric fence monitoring system comprising:

at least two remote units positioned at separate remote points of an electric fence, each said remote unit comprising:
  a sensor coupled to a particular point of said electric fence;
  a remote unit wireless receiver; and
  a remote unit wireless transmitter; and
a monitoring unit, comprising:
  a monitoring unit wireless transmitter;
  a monitoring unit wireless receiver;
  a monitoring processor; and
  a paging means;
said monitoring unit being operable to transmit by means of said monitoring unit wireless transmitter, an information request to a destination remote unit, said information request identifying said destination remote unit and a next-stop remote unit;
a first remote unit, corresponding with said next-stop remote unit, being operable to receive said information request by means of said wireless receiver of said next-stop remote unit, and if said next-stop remote unit is not said destination remote unit, modifying said information request to identify a new next-stop remote unit and transmitting said modified information request by means of said wireless transmitter of said next-stop remote unit;
said destination remote unit being operable to receive said information request by means of said wireless receiver of said destination remote unit, detect a particular electrical condition of said electric fence by means of said sensor, and transmit an information response to said monitoring unit by means of said wireless transmitter of said destination remote unit, said information response signaling message identifying said monitoring unit as a destination and said next-stop remote unit; and said remote unit being further operative to receive said information response by means of said monitoring unit receiver, process said information response signaling message by means of said monitoring unit processor, and cause said paging means to issue a page if said monitoring unit processor detects the existence of an alarm condition.

* * * * *